United States Patent [19]

Reh et al.

[11] 3,894,268

[45] July 8, 1975

[54] TELEVISION DEFLECTION CIRCUIT HAVING HORIZONTAL PINCUSHION CORRECTION

[75] Inventors: Klaus Reh, Albershausen; Peter Schulz, Esslingen-Hegensberg, both of Germany

[73] Assignee: International Standard Electric Corporation, New York, N.Y.

[22] Filed: Aug. 29, 1973

[21] Appl. No.: 392,603

[30] Foreign Application Priority Data

Sept. 9, 1972 Germany........................... 2244277

[52] U.S. Cl. ................................................ 315/371

[51] Int. Cl. ............................................ H01j 29/56

[58] Field of Search....... 315/27 GD, 27 SR, 28, 29, 315/371, 370

[56] References Cited

UNITED STATES PATENTS

| | | | |
|---|---|---|---|
| 3,320,469 | 5/1967 | Slavik | 315/27 GD |
| 3,447,027 | 5/1969 | Kramer | 315/27 GD |
| 3,452,243 | 6/1969 | Knorr, Jr. | 315/27 GD |
| 3,571,653 | 3/1971 | Hansen | 315/27 GD |
| 3,676,733 | 7/1972 | Eulenberg | 315/27 GD |
| 3,760,222 | 9/1973 | Smith | 315/27 GD |

*Primary Examiner*—Maynard R. Wilbur
*Assistant Examiner*—G. E. Montone
*Attorney, Agent, or Firm*—John T. O'Halloran; Menotti J. Lombardi, Jr.; Peter Van Der Sluys

[57] ABSTRACT

A deflection circuit for a television receiver having a vertical final stage powered by a horizontal final stage. A supply circuit containing rectifiers and filters is disposed between the horizontal and vertical stages for rectifying and filtering the horizontal-frequency a.c. voltage. The filter of the supply circuit is designed to oscillate at the frequency of the vertical deflection current and thereby directly modulate the current flowing in the horizontal deflection circuit to provide horizontal pincushion correction. Pincushion correction is enhanced by connecting a pair of RC circuits in parallel with the vertical deflection coils, each RC circuit includes a diode so that one RC circuit conducts in one direction at the beginning of each vertical deflection period, and the other RC circuit conducts in the opposite direction at the end of each vertical deflection period so as to generate a sawtooth current which is superimposed on the current drawn from the horizontal final stage.

5 Claims, 1 Drawing Figure

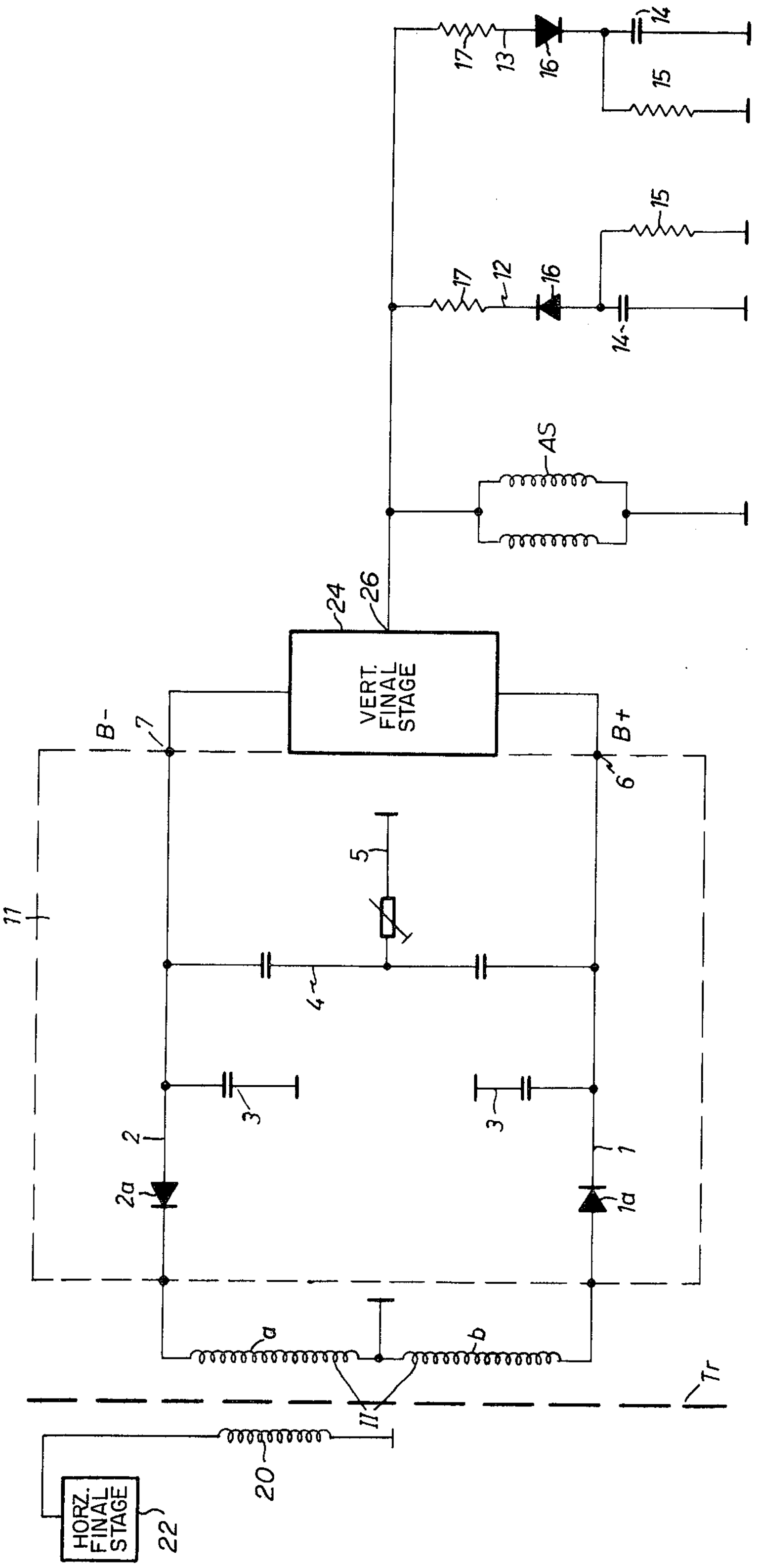
VERT. FINAL STAGE
HORZ. FINAL STAGE
B-
B+
AS
Tr

TELEVISION DEFLECTION CIRCUIT HAVING HORIZONTAL PINCUSHION CORRECTION

BACKGROUND OF THE INVENTION

1. Field of the Invention

This invention relates to deflection circuits for TV receivers, and more particularly to a deflection circuit including a horizontal pincushion correcting circuit.

2. Description of the Prior Art

In a television receiver the electron beam in the cathode ray tube is electromagnetically deflected by using a deflection yoke positioned about the neck of the cathode ray tube. Deflection circuits are used to cyclically vary currents flowing in deflection windings of the yoke. The currents establish a varying electromagnetic field to deflect the electron beam and form a raster on the face of the cathode ray tube. In most instances, it is desirable that the raster be rectangularly shaped.

Various types of electron beam scanning distortions occur and cause the raster configuration to deviate from the desired rectangle. One well known form of raster distortion is called "pincushion distortion". This type of distortion is recognized by the central bowing of the raster scan lines on the top, bottom and sides of the raster. This distortion results primarily from the physical geometry of the deflection system and from the electrical characteristics of the deflection yoke.

Obviously, pincushion distortion is undesirable and many means have been provided for correcting these defects in the raster configuration. For certain applications static correction has proved adequate and is accomplished by establishing a non-varying magnetic field which cooperates with the varying electromagnetic field generated by the deflection yoke to provide a generally rectangular shaped raster. In other applications, however, such as in television receivers where wide-angle deflection is utilized, static correcting means is not suitable. Thus, dynamic correction circuits have been developed. Examples of such circuits may be found in U.S. Pat. No. 3,346,765 and other United States patents referred to therein. In general, the prior art dynamic correcting circuits have utilized transductors having output windings disposed within the deflection circuit and input windings adapted to receive a correction signal. The use of transductors proved to be very expensive and thus undesirable. Excessive amounts of power dissipation also resulted from the use of these inductive components.

A deflection circuit for a television receiver having both horizontal and vertical final stages is disclosed in German published application No. 2,055,081. In this circuit the power for the vertical final stage is taken from the horizontal final stage. A supply circuit is inserted between the horizontal final stage and the vertical final stage and contains diodes and capacitors to rectify and filter the horizontal-frequency alternating voltage so as to provide a substantial d.c. supply voltage for the vertical final stage. The filter had to be quite substantial so that the current tapped for the vertical deflection circuit did not react with the high voltage used to operate the television picture tube, since this high voltage was also supplied by the horizontal deflection stage.

Recent developments have provided a high voltage stabilization circuit. With the use of this circuit it is not longer necessary that the filtering be as effective as in the past, since fluctuations in the current used to power the horizontal and vertical deflection circuits do not have an appreciable effect on the high voltage used to operate the picture tube.

SUMMARY OF THE INVENTION

The present invention contemplates the use of a high voltage stabilization circuit so that the deflection current tapped by the vertical deflection circuit will not effect the high voltage operation of the tube. Thus, substantial fluctuations in deflection current may be tolerated.

The present invention is characterized in that the filter means of the supply circuit is proportioned so that the current flowing in the supply circuit oscillates at the frequency of the vertical deflection current. The increased current at the beginning and end of a vertical sweep directly modulates the horizontal deflection current and provides correction for horizontal pincushion distortion by reducing the horizontal beam deflection at the upper and lower portions of the raster.

The invention further contemplates the use of a variable element in the filter means so as to provide a tuning adjustment and thereby vary the amount of correction in accordance with the degree of filtering provided.

The invention additionally contemplates the use of an RC network consisting of two branches connected in parallel with the vertical deflection circuit. Each branch contains a diode orientated so that the current flows in opposite directions in the two branches. Thus, one branch conducts the beginning of a vertical deflection period while the other branch conducts at the end of the vertical deflection period, thereby generating a sawtooth current which is superimposed on the current taken from the horizontal final stage and thereby provides additional pincushion correction if needed.

The present invention substantially reduces component cost by eliminating expensive inductive elements while providing a high order of operating stability. The correction characteristics provided are not only unaffected by manufacturing variations of the components that have been eliminated, but are also closely linked with the shape and amplitude response of the vertical deflection current.

It is a primary object of the present invention to provide a deflection circuit that includes means for correcting geometric distortions of the television picture tube raster while eliminating the use of expensive inductive elements.

It is another object of the present invention to provide a deflection circuit with reduced power dissipation.

The foregoing objects and advantages of the invention will be best understood with reference to the following description in conjunction with the drawing.

DESCRIPTION OF THE DRAWING

In the FIGURE, there is shown a schematic diagram of a deflection circuit constructed in accordance with the present invention.

DESCRIPTION OF THE INVENTION

Referring to the FIGURE, a transformer Tr has a primary winding 20 connected to the horizontal final stage 22 and a secondary winding II, divided into two symmetrical partial windings a and b having a grounded center tap. A supply circuit 11 is connected to the secondary windings a and b for providing power to a vertical final stage 24. The supply circuit comprises a pair of symmetrical branches 1 and 2 including diodes 1*a* and 2*a* which function as half wave rectifiers for rectifying the alternating current flowing in secondary winding II. Filter means in the form of capacitors 3 are connected between branches 1 and 2 and ground to filter the rectified current in the conventional manner. Capacitor 3 is selected to substantially eliminate the horizontal deflection frequency, so that d.c. supply voltages B+ and B− are offered to the vertical final stage 24 at terminals 6 and 7 respectively.

The current flowing through the terminals 6 and 7 increases and decreases at the frequency of the vertical deflection current and, through the proportioning of capacitor 3, modulates by way of transformer Tr the current flowing in the horizontal final stage so as to provide a degree of pincushion correction.

A pair of series connected capacitors 4 are connected between branches 1 and 2 and an adjustable resistor 5 is connected between ground and the connection between capacitors 4. Adjustment of resistor 5 provides for the variation of the effect of the vertical deflection current on the horizontal deflection current. Adjustable resistor 5 allows the supply circuit 11 to be tuned to the frequency of the vertical deflection current and also provides for adjusting the degree of filtering to vary the effect of the vertical deflection current on the horizontal deflection current.

Vertical final stage 24 is connected to terminals 6 and 7 for receiving the B+ and B− d.c. supply voltages. Vertical final stage 24 may be any conventional type vertical final stage having an output 26. The vertical deflection coils AS are connected to output 26 of the vertical final stage in a manner well known in the art.

In order to provide increased horizontal pincushion correction, an RC network is connected in parallel with the deflection circuit AS of the vertical final stage 24. The RC network comprises two branch circuits 12 and 13 each including a capacitor 14 with a shunt resistor 15, said capacitor and shunt resistor being connected in series with a diode 16 and a dropping resistor 17. The diodes 16 are connected so that the currents in branches 12 and 13 flow in opposite directions. Branch 12 conducts at the beginning of a vertical deflection period and branch 13 conducts at the end of a vertical deflection period thereby providing increased current demands on the horizontal final stage at the beginnings and ends of the vertical deflection periods so as to provide additional horizontal pincushion correction. In effect, the RC network generates a sawtooth current which is superimposed on the current drawn from the horizontal final stage by the vertical final stage.

Thus, the present invention provides a deflection circuit having both horizontal and vertical final stages and which provides horizontal pincushion correction without the use of transductors. The circuit requires less power than those heretofore provided and in addition substantially reduces the component cost while providing a high order of operating stability.

What is claimed is:

1. A deflection circuit for a television receiver, comprising:

- a horizontal final stage providing a horizontal-frequency a.c. output;
- a vertical final stage providing a vertical-frequency a.c. output;
- a supply circuit disposed between the horizontal final stage and the vertical final stage for providing power to the vertical final stage from the horizontal final stage, said supply circuit including
  - means for rectifying and filtering the a.c. output from the horizontal final stage so as to remove the horizontal frequency, said filter means being tuned so that the current flowing in the supply circuit oscillates at the vertical frequency, whereby the current flowing in the supply circuit directly modulates the current flowing in the horizontal deflection circuit and provides horizontal pincushion correction.

2. A circuit arrangement in accordance with claim 1, wherein the filter means includes an adjustable component to vary the degree of filtering and thereby vary the amount of pincushion correction.

3. A circuit arrangement in accordance with claim 1, wherein the supply circuit comprises a pair of symmetrical branches each including rectifying and filter means for rectifying and filtering the alternate positive and negative components of the horizontal a.c. output.

4. A circuit arrangement in accordance with claim 3, additionally comprising a voltage divider consisting of two serially connected capacitors connected across the first and second branches of the supply circuit and an adjustable resistor connected between the junction of the serially connected capacitors and ground, said adjustable resistor providing for variation of the tuning of the filter means and for varying the correction provided.

5. A circuit arrangement in accordance with claim 1, additionally comprising:

- a pair of RC networks connected in parallel with the output of the vertical final stage, said RC networks each including a diode orientated so that the current in one RC network flows in a first direction and the current in the other RC network flows in an opposite direction so that the RC networks conduct at the beginning and at the end of each vertical deflection period so as to generate a sawtooth current which is superimposed on the current drawn from the horizontal final stage by the vertical final stage to provide additional horizontal pincushion correction.

* * * * *